United States Patent [19]

Meyn

[11] 4,183,117
[45] Jan. 15, 1980

[54] APPARATUS FOR SPLITTING, CLEANING AND SKINNING POULTRY GIZZARDS

[76] Inventor: Pieter Meyn, Noordeinde 68, Oostzaan, Netherlands

[21] Appl. No.: 848,030

[22] Filed: Nov. 3, 1977

[30] Foreign Application Priority Data

Nov. 28, 1976 [NL] Netherlands ............... 7613251

[51] Int. Cl.² .................................. A22C 21/00
[52] U.S. Cl. ................................ 17/11; 17/21
[58] Field of Search .............. 17/11, 21, 50, 62, 43

[56] References Cited

U.S. PATENT DOCUMENTS

| | | | |
|---|---|---|---|
| 2,239,199 | 4/1941 | Pulley | 17/43 |
| 3,290,722 | 12/1966 | Norks | 17/43 |
| 3,930,283 | 1/1976 | Martin et al. | 17/11 |
| 4,073,040 | 2/1978 | Hill | 17/11 X |

Primary Examiner—Willie G. Abercrombie
Attorney, Agent, or Firm—Bailey, Dority & Flint

[57] ABSTRACT

An apparatus for splitting, cleaning and skinning poultry gizzards having a transport chain which takes the gizzards past a rotating knife for cutting open the gizzards, a spreading bar for folding open the split gizzards and a rotating brush for removing the contents of the split and spread gizzards, to a set of peeling rolls for removing the lining from the split, spread and cleaned gizzards. The apparatus has two positioning rolls which bring the gizzards, which previously have been separated from the remaining entrails including the stomach, into the right position for receipt by the transport chain, and two pressure discs, rotating in synchronization with the transport chain about a horizontal shaft, which lift the split, spread and cleaned gizzards from the transport chain and press them briefly onto the peeling rolls.

6 Claims, 5 Drawing Figures

APPARATUS FOR SPLITTING, CLEANING AND SKINNING POULTRY GIZZARDS

BACKGROUND OF THE INVENTION

The invention relates to an apparatus for splitting, cleaning and skinning poultry gizzards and more in particular to an apparatus of this kind having an endless transport chain, which runs over two sprocket wheels and is provided with protrusions for pushing and transporting the gizzards from a supply chute or hopper near one of the sprocket wheels, past a rotating knife for cutting open the gizzards, a spreading bar for folding upon the split gizzards, and a cleaning means for removing the contents of the gizzards, and for finally delivering the the split and spread gizzards to a set of peeling rolls near the other sprocket wheel, for removing the lining or skin from the gizzards, and further having means which bring the gizzards into the desired position for being received by the transport chain and make sure that the split gizzards are taken from the chain and are pressed onto the peeling rolls in such manner, that the skin will be grasped by the peeling rolls.

The various known apparatusses for splitting and peeling gizzards all comprise a rotating knife for cutting open the gizzards, peeling rolls for removing the skin from the cut open gizzards and transport means for moving the gizzards past the knife to the peeling rolls. These transport means may consist of chains, belts or augers.

The main problem with apparatusses of this kind is to correctly position the gizzards for splitting and for pulling out the skin. The gizzards are somwhat almond shaped and must be moved past the knife in such manner, that they are cut open lengthwise in one of the narrow sides and to such depth, that the gizzard halves remain interconnected but may be spread so far apart that the whole skin is exposed. If the gizzards are cut open in a different position recessed folds may remain in the skin when the gizzards are spread, so that the skin cannot be removed completely by the peeling rolls. Before removal of the skin the gizzards must be loosened from the transport means and pressed with the inner surface onto the peeling rolls, so that the skin may be grasped by the peeling rolls and torn loose.

It has been proposed to leave the remaining entrails attached to the gizzards so that the weight thereof may by used to bring the gizzards into the right position for receipt by the transport means. This however may be undesirable for hygienic reasons and has the disadvantage that the gizzards must be processed immediately after evisceration of the fowl and on the same spot.

It has also been proposed to leave only the stomach attached to the gizzards for positioning the gizzards and also to be able to pull the split gizzards onto the peeling rolls by means of the stomachs. This however has the disadvantage that the stomachs must be removed from the gizzards after the skinning thereof, which is difficult and makes the apparatus more complicated.

Various mechanical means have been proposed for positioning the gizzards relative to the knife and/or for pressing the gizzards onto the peeling rolls. In most cases these means are rather complicated which makes the apparatus vulnerable and expensive. It has further been proposed to position the gizzards by means of vacuum or jets of water. The use of vacuum has the disadvantage that vacuum pipes are easily blocked by remnants of the gizzards' contents after which the apparatus will not function right and also always may cause aerosol contamination. The use of water, which more often than not is also used for removing the contents of the gizzards, should be avoided as much as possible, because of the large costs of a large water consumption and the high costs of purification of waste water.

SUMMARY OF THE INVENTION

It is the principal object of the invention to provide an apparatus of simple construction, in which the gizzards are positioned relative to the knife and the peeling rolls by simple means, and in which the consumption of water is limited as far as possible.

According to the invention this object is realized in an apparatus of the kind refered to, in that the split gizzards are taken from the transport chain and are pressed onto the peeling rolls extending in line with the chain, by two pressure discs mounted on either side of the second sprocket wheel and concentrically rotating therewith, the diameter of the pressure discs being larger than the diameter of the sprocket wheel. These pressure discs lift the gizzards from the transport chain, makes them free of the protrusions thereof and press them briefly onto the peeling rolls, which is sufficient to make sure that the skin is gripped by the peeling rolls. Contrary to common belief it was shown in practice, that it is not necessary to press the gizzards down on the peeling rolls over the whole length thereof, since the peeling rolls do not release the skin again once it is caught.

Preferably the gizzards are brought into the right position for receipt by the transport chain by two mutually parallel, counter rotating supply rolls, the spacing and diameter of which is so chosen, that the gizzards are received by the transport chain lengthwise and resting on one narrow side, a stationary support being provided between the supply rolls to prevent the gizzards from passing between the supply rolls. The supply rolls form a simple and effective positioning means.

Advantageously at least one rotating brush is mounted near the transport chain between the knife and the peeling rolls, which removes the contents from the split gizzards.

BRIEF DESCRIPTION OF THE DRAWINGS

Further objects, features and advantages of the invention will become apparent from the following description of a preferred embodiment of the invention taken in connection with the accompanying drawings, in which.

DETAILED DESCRIPTION OF THE PREFERED EMBODIMENT

Figure 1:
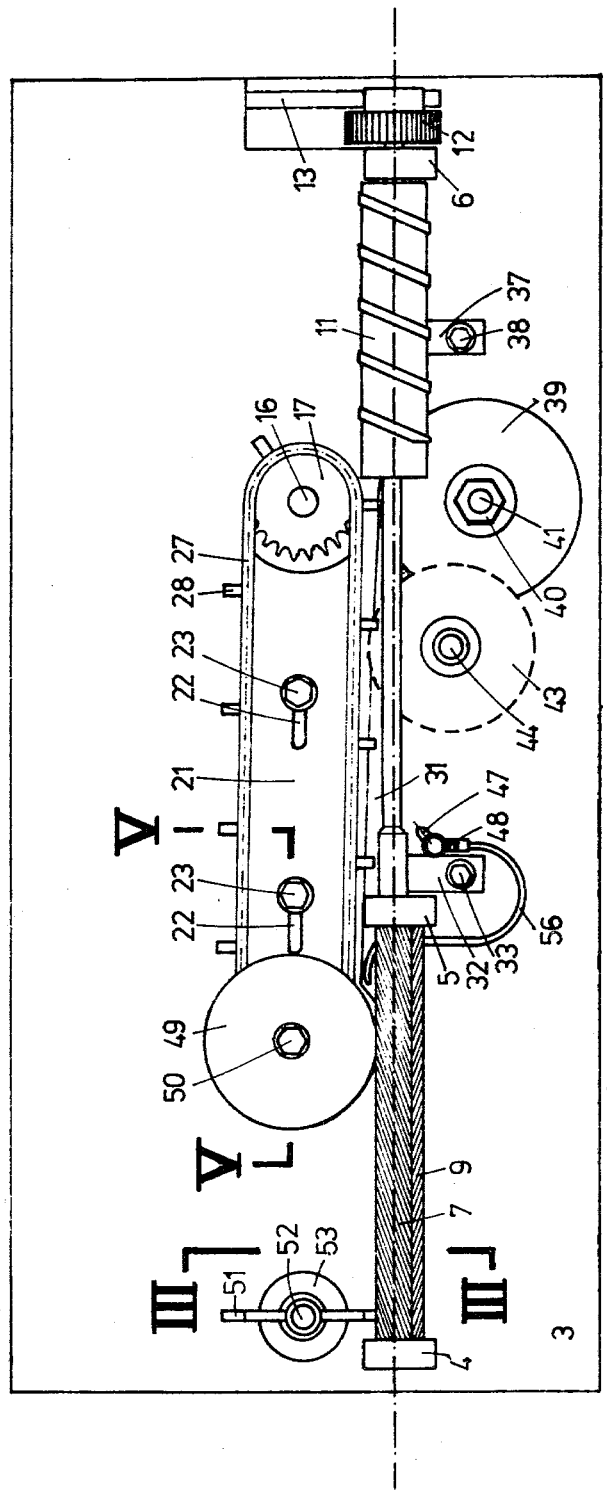
FIG. 1 is a side view of a gizzard splitter and skinner according to the invention.
Figure 2:
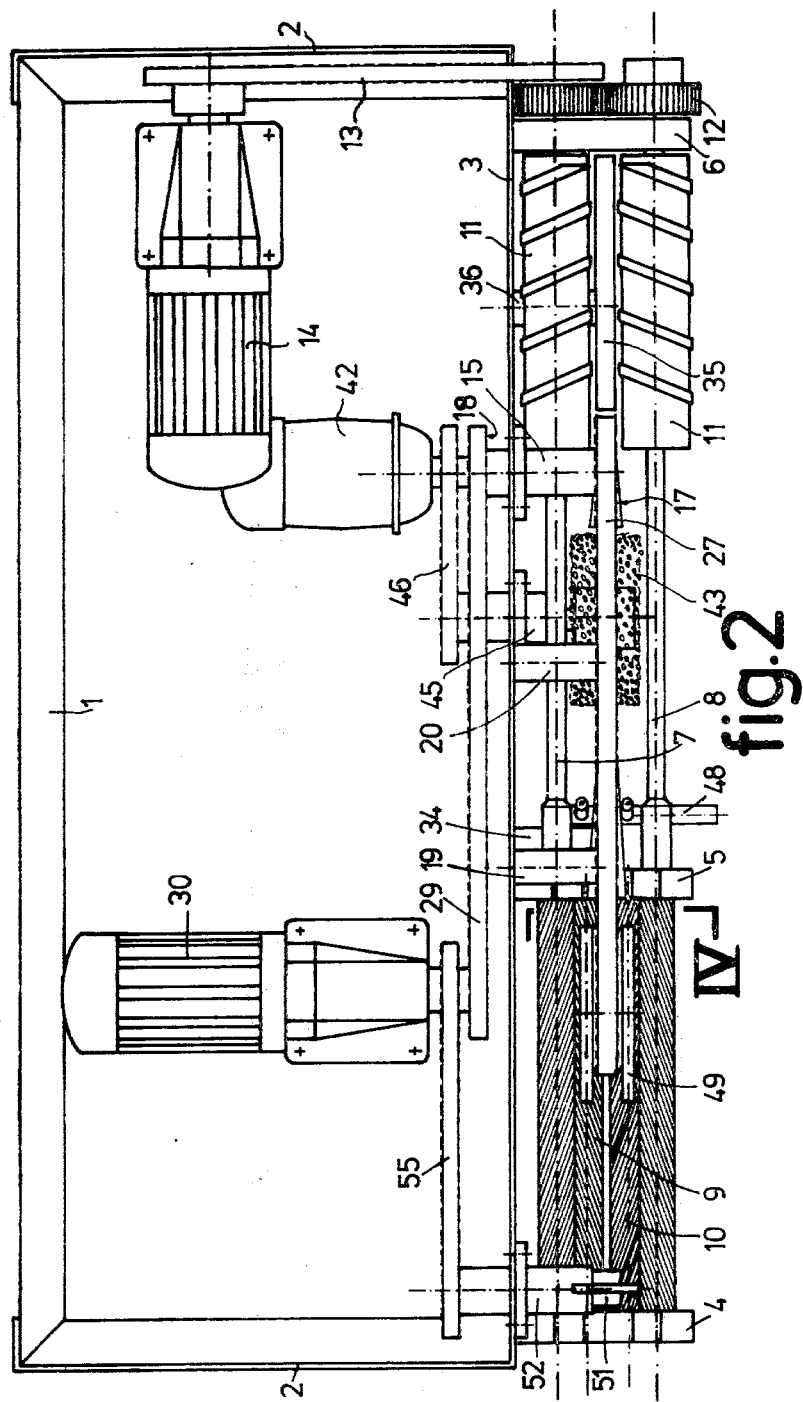
FIG. 2 is a top view of the apparatus shown in FIG. 1.
Figure 3:
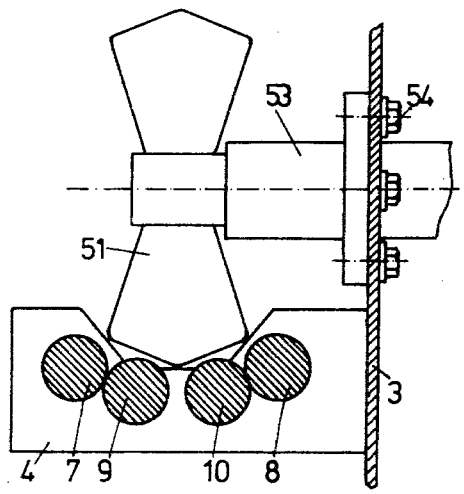
FIG. 3 is a sectional view taken along the line III—III in FIG. 1.

The apparatus shown in the drawings is for splitting, cleaning and skinning poultry gizzards, which have previously separated from the remaining entra`s.

The apparatus is provided with a rectangular frame 1, with upright end walls 2 and a side wall 3, which at the outside carries three supports 4, 5 and 6, which extend perpendicular outwards from the side wall at the same level. In these supports two mutually parallel shafts 7 and 8 are rotatably mounted in parallel with the side wall 3. Between the supports 4 and 5 the shafts 7 and 8 are executed as peeling rolls, which together with the peeling rolls 9 and 10 also rotatably mounted in parallel between the supports 4 and 5, form two pairs of peeling rolls, which laterally slightly slope upwards so that a shallow peeling channel is formed with a V-shaped cross section.

Between the supports 5 and 6 each of the shafts 7 and 8 supports a supply or positioning roll 11 adjoining the support 6, the supply rolls 11 being fixed to the shafts 7 and 8 rotate therewith. On the ends of the shafts sticking out on the other side of the support 6, two meshing gears are provided, and this end of the shaft 7 is further provided with a sprocket wheel, which is driven by a motor 14 mounted within the frame 1, by means of a chain 13 passing through an opening in the side wall 3.

Over the outer ends of the supply rolls 11 a bearing assembly 15 is mounted on the side wall 3, in which a shaft 16 passing through the wall 3, is rotatably mounted. On both ends of the shaft 16 a sprocket wheel 17, respectively 18, is fixed. Further, two laterally extending brackets 19 and 20 are fixed to the side wall 3 between the supports 5 and 6 and over the shafts 7 and 8. A support plate 21 is adjustably attached to the brackets 19 and 20 in parallel with the side wall 3, by means of screws 23 passing through slots 22 in the plate 21. The height of the plate 21 corresponds with the diameter of the sprocket wheel 17, which it adjoins and with which it lies in a common vertical plane equidistant from the shafts 7 and 8. The end of the support plate 21 opposite to the sprocket wheel 17 is provided with a fork 24, in which a vertical sprocket wheel 25 is rotatably mounted by means of bushings 26, as is most clearly shown in FIG. 5. Over the sprocket wheels 17 and 25 and the support plate 21 a transport chain 27 passes, which at regular intervals is provided with outwardly extending protrusions 28. The transport chain 27 is driven by a motor 30 supported within the frame 1, by means of a chain 29 passing over the sprocket wheel 18. The chain 27 may be tightened by moving the adjustable support plate 21 away from the sprocket wheel 17.

Straight below the lower flight of the transport chain 27 a spreading bar 31 is mounted between the shafts 7 and 8, as is shown in FIG. 1. The bar 31 has a vertical arm 32, which by means of a screw 33 is adjustably attached to a bracket 34 fixed to the side wall 3.

Now when the motors 14 and 30 are energized the shafts 7 and 8, being coupled by means of the gears 12, will rotate towards each other, and the peeling rolls 9 and 10 will be driven by the peeling roll parts of the shafts 7 and 8 with which they mesh, whereas at the same time the lower flight of the transport chain 27 will move towards the peeling rolls.

The gizzards which are supplied from a chute or hopper, not shown in the drawings, to the supply rolls 11, will be moved towards the transport chain 27, during which the somewhat almond-shaped gizzards will drop with one of their narrow sides between the supply rolls, so that they are brought into the right position for being received by the transport chain 27. An abutment bar 35 provided between the supply rolls 11 prevents the gizzards from passing between the supply rolls. The abutment bar 35 is adjustably attached to a bracket 36 by means of an arm 37 and a screw 38, the bracket 36 being fixed to the side wall 3.

Reaching the transport chain 27 a gizzard will be caught by one of the protrusions 28 and while still being held upright by the ends of the supply rolls 11, will be moved by the lower flight of the transport chain 27 past a vertical rotating knife 39, which is mounted between the shafts 7 and 8 below the chain 27 and cuts the gizzard open lengthwise in the lower narrow side. The distance between the knife 39 and the lower flight of the transport chain 27 is so chosen, that the gizzard is only split to such depth, that the gizzard halves remain interconnected. By means of a nut 40, the knife 39 is attached to a shaft 41, which passes through the side wall 3 and is driven by a motor 42 adjustably supported within the frame 1.

Having past the knife 39 the gizzard is pulled by the chain 27 along the spreading bar 31, which is aligned with the top of the knife 39 and gradually becomes wider, so that the gizzard halves spread apart. The gizzard then passes a rotating brush 43, which is mounted between the shafts 7 and 8 below the bar 31, and removes the contents from the split gizzard. The brush 43 is mounted on a shaft 44, which is journalled in a bearing assembly 45, fixed to the side wall 3, and on the other side of the wall 3 carries a sprocket wheel, which is driven by the motor 42 by means of a chain 46.

The gizzard then passes a pair of nozzles 47, which are connected to the water mains by means of a manifold 48, and wash the gizzards completely clean.

Figure 5:
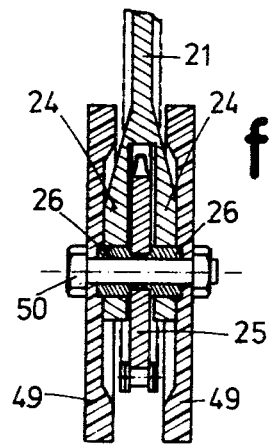
FIG. 5 is a sectional view taken along the line V—V in FIG. 1.
Figure 4:
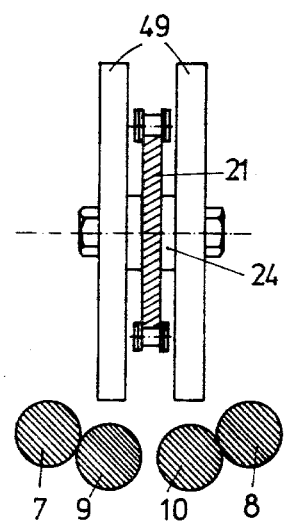
FIG. 4 is a sectional view taken along the line IV—IV in FIG. 2.

After passing the nozzles 47 the gizzard, which on both sides sticks out from the chain 27 and the spreading bar 31, is taken from the chain 27 by two pressure discs 49, which as shown in FIG. 5, are mounted on either side of the fork 24 of the chain support plate 21 and are rigidly coupled with the sprocket wheel 25 by means of a bolt 50 and the bushings 26, so that the discs 49 concentrically rotate with the sprocket wheel 25.

Since the diameter of the discs 49 is larger than the diameter of the sprocket wheel 25, the discs lift the gizzard from the chain 27, make it free from the protrusion 28 and press it briefly with the exposed inside surface on the inner peeling rolls 9 and 10, so that the peeling rolls catch the skin and tear it loose from the gizzard.

Although the gizzard is only briefly pressed on the peeling rolls by the discs 49, in practice this is long enough to make sure that the skin is completely removed. Since the gizzard halves are thicker in the middle than at the outer edges, these edges tend to turn up, but as the peeling roll parts of the shafts 7 and 8 are slightly elevated relative to the inner peeling rolls 9 and 10, the skin at the outer edges of the spread apart gizzard halves is nevertheless caught by the peeling rolls.

As they tear out the skin the peeling rolls quickly move the gizzard towards the end of the peeling channel formed by the peeling rolls, where the gizzard is removed from the peeling channel by one of the arms of a rotating discharge member 51. The shaft 52 of this discharge member 51 is journalled in a bearing assembly 53, the flange of which is, like the flanges of the other bearing assemblys 15 and 45, fixed to the side wall 3 by means of four screws 54. On the other side of the wall 3 a sprocket wheel is fastened on the end of the shaft 52, which is driven by the motor 30, also driving the transport chain 27, by means of a chain 55.

The peeling rolls are constantly cleaned with water, which is sprayed over the peeling rolls by pipes 56 connected to the manifold 48. It will be understood that the gears 12 and the chain 13 are covered, and that a chute is provided under the shafts 7 and 8 for collecting the contents of the gizzards, the removed skins and the waste water, even though these parts like the supply hopper earlier mentioned, are not shown in the drawings. The shafts 7 and 8, the brush 43 and the chain 27 are also provided with a suitable cover.

I claim:

1. Apparatus for splitting and skinning poultry gizzards comprising:
   a frame;
   an endless transport chain running over two vertical sprocket wheels rotatably mounted on said frame;
   a vertical circular knife mounted for rotation adjacent the working flight of said transport chain on said frame;
   a spreading bar mounted adjacent said working flight of said transport chain on said frame;
   a set of horizontal peeling rolls mounted for rotation on said frame; and
   means for driving said transport chain, said knife and said peeling rolls;
   said transport chain being adapted to receive the gizzards to be processed at one of said sprocket wheels, for moving the received gizzards past said knife in order to split the gizzards and over said spreading bar in order to fold open the split gizzards, and for finally delivering the split and spread gizzards to said peeling rolls at the other of said sprocket wheels to remove the skin from the gizzards;
   the apparatus further comprising:
   two pressure discs mounted on either side of said other sprocket wheel and coupled therewith for synchronized and concentric rotation;
   the diameter of said pressure discs being larger than the diameter of said other sprocket wheel; and
   said pressure discs being adapted to lift the split and spread gizzards from said transport chain and press them briefly with their inner surface on said peeling rolls.

2. Apparatus according to claim 1, further comprising:
   two mutually parallel horizontal positioning rolls mounted for counter rotation on said frame near said one sprocket wheel;
   means for driving said positioning rolls; and
   a stationary support bar mounted between said positioning rolls and attached to said frame;
   said positioning rolls being adapted to bring the gizzards to be processed in the right position for being received by said transport chain; and
   the diameter and spacing of said positioning rolls being so chosen that the gizzards are received by said transport chain lengthwise and resting on one of there narrow sides, said support bar preventing that the gizzards pass between said positioning rolls.

3. Apparatus according to claim 1, further comprising:
   at least one cylindrical brush mounted for rotation adjacent said working flight of said transport chain and said spreading bar on said frame; and
   means for driving said brush; said brush being adapted to remove the contents of the split and spread gizzards.

4. Apparatus according to claim 2, further comprising:
   at least one cylindrical brush mounted for rotation adjacent said working flight of said transport chain and said spreading bar on said frame; and
   means for driving said brush;
   said brush being adapted to remove the contents of the split and spread gizzards.

5. Apparatus according to claim 1, further comprising:
   a discharge member mounted on said frame above the ends of said peeling rolls opposite from said other sprocket wheel for rotation in the vertical plane of symmetry of the peeling rolls; and
   means for driving said discharge member;
   said discharge member being adapted to remove the skinned gizzards from said peeling rolls.

6. Apparatus according to claim 2, further comprising:
   a discharge member mounted on said frame above the ends of said peeling rolls opposite from said other sprocket wheel for rotation in the vertical plane of symmetry of said peeling rolls; and
   means for driving said discharge member;
   said discharge member being adapted to remove the skinned gizzards from said peeling rolls.

* * * * *